US011962967B2

(12) United States Patent
Giovannoni

(10) Patent No.: US 11,962,967 B2
(45) Date of Patent: Apr. 16, 2024

(54) DEVICE FOR SOUND REPRODUCTION

(71) Applicant: Rocco Giovannoni, Milan (IT)

(72) Inventor: Rocco Giovannoni, Milan (IT)

( * ) Notice: Subject to any disclaimer, the term of this patent is extended or adjusted under 35 U.S.C. 154(b) by 186 days.

(21) Appl. No.: 17/621,984

(22) PCT Filed: Jun. 25, 2020

(86) PCT No.: PCT/IB2020/056019
§ 371 (c)(1),
(2) Date: Dec. 22, 2021

(87) PCT Pub. No.: WO2021/001733
PCT Pub. Date: Jan. 7, 2021

(65) Prior Publication Data

US 2022/0264217 A1 Aug. 18, 2022

(30) Foreign Application Priority Data

Jun. 27, 2019 (IT) ........................ 102019000010218

(51) Int. Cl.
*H04R 1/10* (2006.01)

(52) U.S. Cl.
CPC ......... *H04R 1/1075* (2013.01); *H04R 1/1008* (2013.01); *H04R 1/1041* (2013.01); *H04R 2460/13* (2013.01)

(58) Field of Classification Search
None
See application file for complete search history.

(56) References Cited

U.S. PATENT DOCUMENTS 8,213,643 B2 * 7/2012 Hemer .................. H04R 17/00 381/151
9,621,973 B2 * 4/2017 Stauber .................. H04R 1/26
2004/0247143 A1 12/2004 Lantrua et al.
2008/0112581 A1 5/2008 Kim et al.

FOREIGN PATENT DOCUMENTS

| | | | |
|---|---|---|---|
| DE | 102005016018 | A1 | 10/2006 |
| EP | 3151581 | A1 | 4/2017 |
| WO | WO2019070175 | A1 | 4/2019 |

OTHER PUBLICATIONS

Written Opinion & International Search Report for PCT/IB2020/056019 dated Sep. 22, 2020, (9 pages).

* cited by examiner

*Primary Examiner* — Paul W Huber
(74) *Attorney, Agent, or Firm* — Reising Ethington P.C.

(57) ABSTRACT

Device for reproducing sounds, in particular sounds intended to be perceived by a subject using said device, comprising a containment element in which a transducer, preferably of an electro-acoustic type, is housed, which is configured to emit vibrations substantially corresponding to the sound to be reproduced, and a liquid or gel state medium which is contained inside said containment element, said medium being configured to transmit the sound vibrations generated by said transducer to a transmission element intended to be applied in direct contact with a body area of said user, thereby transmitting said sound vibrations to said body area, wherein the containment element consists of a single housing chamber and the transducer is immersed entirely or partially in the medium inside said chamber.

16 Claims, 4 Drawing Sheets

Figure 1:
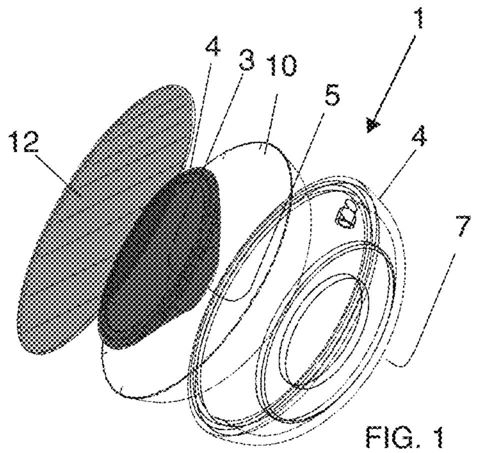

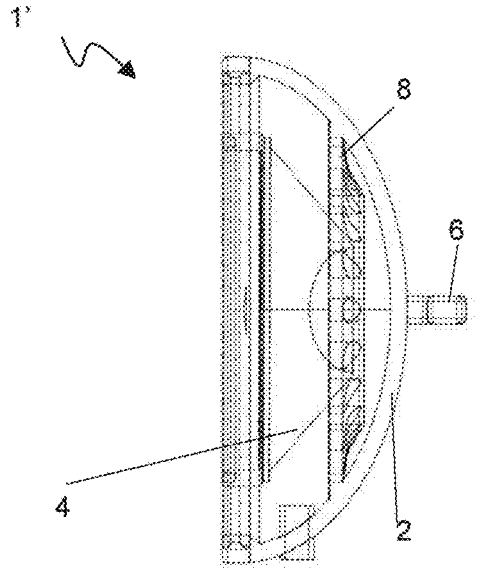
FIG. 6a
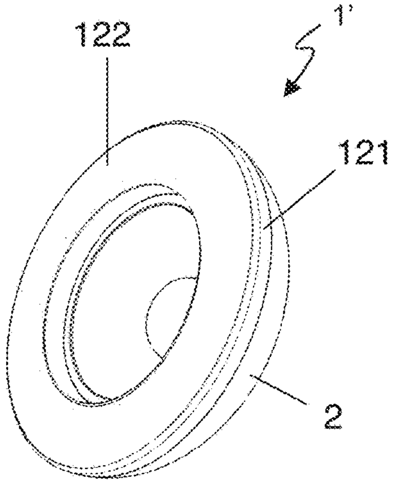
FIG 6b
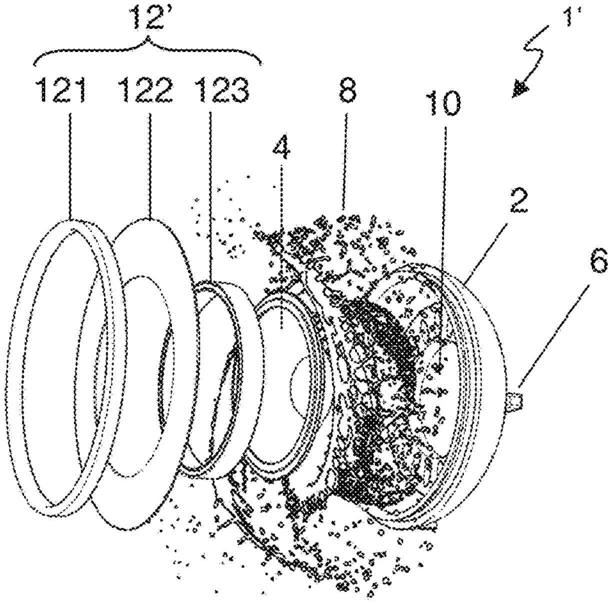
FIG. 6c
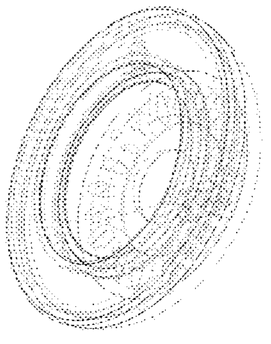

DEVICE FOR SOUND REPRODUCTION

The present invention relates to a device for reproducing sounds, in particular sounds intended to be perceived by a user of said device.

Various devices for reproducing sounds are currently known. In general, a traditional device for reproducing sounds comprises the following components:

- a sound generator which generally consists of a transducer configured to convert an electrical signal into sound waves to be transmitted to the user,
- an auricle which basically defines the environment in which the transducer is contained.

The device must also use a sound medium, i.e., the material within which the sound waves generated by the transducer propagate. In traditional devices the medium is atmospheric air.

However, since air is not the optimal medium for transmitting frequencies below 200 Hz, such devices require the use of additional dedicated devices, such as subwoofers (in the case of stereo systems, for example) or very sophisticated drivers (in the case of headphone drivers, for example), which generally have a high cost or high energy consumption.

In addition, devices which exploit bone conduction are currently known. In particular, these devices involve transmitting vibrations directly from the transducer to bones, generally to the bones of the user's skull; in more detail, passing through the bones, the sound vibrations bypass the outer and middle ear, instead directly affecting the inner ear. These devices are mainly used for patients with malformations or dysfunctions of the ear canal, in particular of the parts relating to the outer or middle ear, while the part (or at least a part) of the inner ear must be functional.

Devices have also been developed which, by exploiting bone conduction, allow healthy users to perceive sounds—generated by the devices themselves—without using the outer ear, thus allowing the latter to hear additional sounds from the external environment.

However, also these traditional devices are not fully satisfactory because, by requiring direct contact between the transducer and the user's bones, they are uncomfortable to wear and use, also demonstrating acoustic dispersion problems and frequency limitations. In addition, multiple external and internal inputs can be created, thus causing excessive stimulation for the user. In particular, some of these known devices generate significant pressure on the mastoid area, thus being unpleasant—and therefore unwanted—for the user.

Bone conduction devices using a support, through which vibration is transmitted to the user, are also known and can be positioned in different portions of the user's body. If rigid materials are used, the device does not have optimal adhesion to the user's skin, thus making the transmission of vibration to the user unsatisfactory.

By way of example, document US 2004/247143 A1 describes a device for listening to human voice and musical signals via a bone transmission. The device comprises a piezoelectric transducer positioned between two separate watertight chambers and each filled with an incompressible gel or fluid. The two chambers thus represent a front chamber in contact with the skull and a rear chamber in contact with the rear region of the transducer. Although the configuration of this device may improve the convenience of use by the user compared to similar bone conduction devices, the fact that the chamber in contact with the skull is only the front chamber results in a reduction in the quality of the transmitted acoustic signal.

The object of the invention is to propose a device for reproducing sounds, which partially or totally overcomes the disadvantages of the known art and which makes it possible to effectively reproduce both low and high frequencies.

Another object of the invention is to propose a device which is comfortable to use for the user.

Another object of the invention is to propose a device which can also be used by subjects with ear canal diseases, in particular with lesions of the outer and/or middle ear.

Another object of the invention is to propose a device which allows a multi-sensory and immersive experience.

Another object of the invention is to propose a device which allows an omnidirectional listening experience.

Another object of the invention is to propose a device which can be used by users with various kinds of hearing problems and specifically in the rehabilitation treatments of the hearing system.

Another object of the invention is to propose a device which allows energy savings with reference to low frequencies (<250 Hz) compared to traditional devices or subwoofers.

Another object of the invention is to propose a device which is an improvement and/or alternative to the traditional ones.

Another object of the invention is to propose a device with an alternative characterisation, both in terms of construction and function, compared to the traditional ones.

Another object of the invention is to propose a device which is obtainable in a simple, fast and low-cost manner.

All of these objects, considered individually or in any combination thereof, and others that will result from the description below, are achieved according to the invention with a sound reproduction device as defined in claim 1.

Figure 2A:
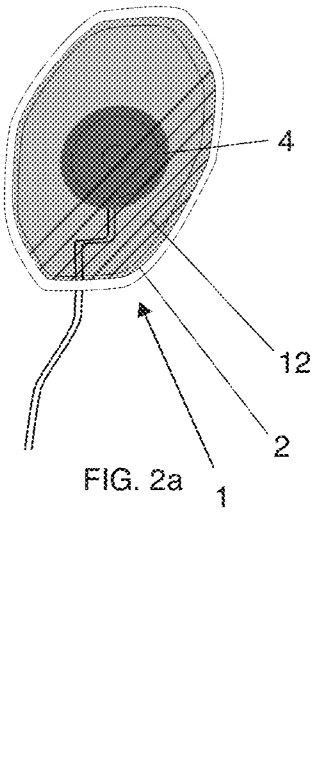
Figure 2B:
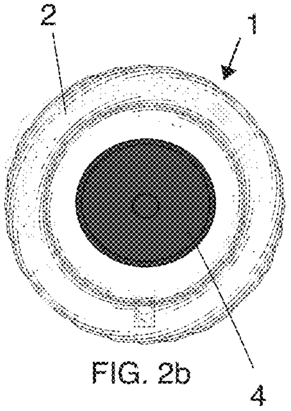
Figure 3:
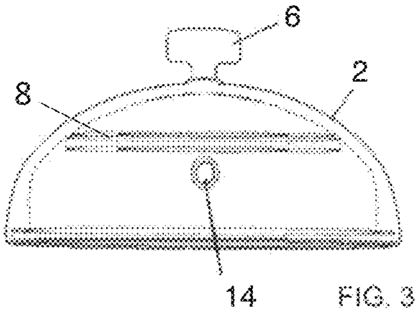
Figure 4:
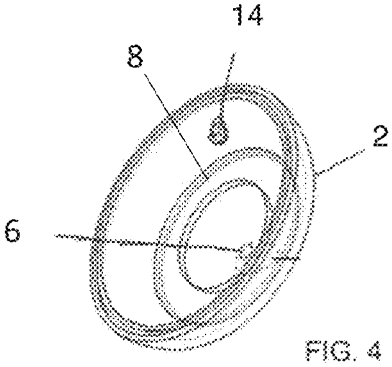
Figure 5A:
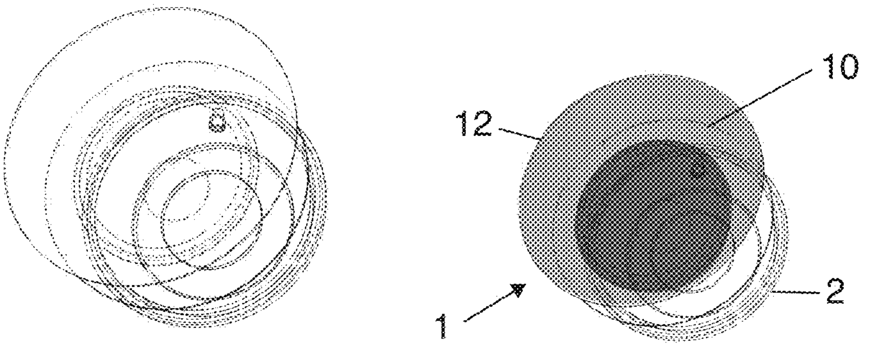
Figure 5B:
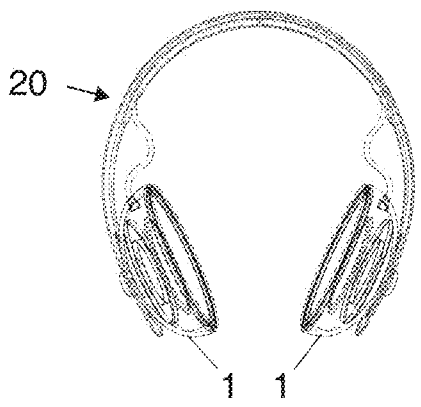
Figure 5C:
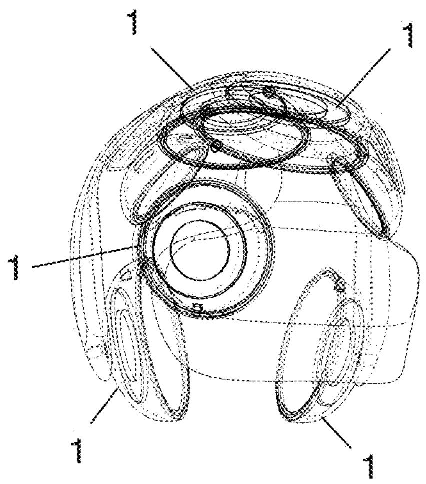

The present invention is further clarified below in some of its preferred embodiments given purely by way of non-limiting example, with reference to the accompanying drawings, in which:

FIG. 1 shows a perspective exploded view of the device according to the invention, FIG. 2*a* shows a photography of a first embodiment of the invention, FIG. 2*b* shows a photography of a second embodiment of the invention, FIG. 3 shows in lateral section the only containment element of the device according to the invention, FIG. 4 shows it in front perspective view, FIG. 5 *a-c* shows various embodiments of apparatuses comprising the device according to the invention, FIG. 6 *a-c* shows the device according to an alternative embodiment.

As shown in the figures, the sound reproduction device 1 according to the invention is configured to transmit sound to the user substantially directly, i.e. without the need for an external medium. Advantageously, this allows the device to be applied both at/around the auricle, and at other portions of the user's body.

In particular, the device 1 comprises a containment element 2. Preferably, the containment element 2 acts as an auricle.

Advantageously, the containment element 2 is cup-shaped, preferably substantially hemispherical in shape. Suitably, the containment element 2 wraps and houses therein a transducer 4, preferably electro-acoustic, configured to emit vibrations (pressure waves) substantially corresponding to the sound to be reproduced.

Suitably, the outer containment element could have substantially ogival, or substantially shell or slightly conical shape, or another shape which optimizes the reflection of sound waves in the chosen frequency range.

Suitably, an insert 6 protrudes outwards from the containment element 2, the insert being configured to allow the mechanical connection or fixing between the device and a support element such as for example a headband, a helmet or the like, to keep the device in position with respect to the user's ear. Suitably the insert may be substantially T-shaped, alternatively it may have substantially tubular shape, or any other shape.

Suitably, the containment element 2 comprises a hole or a through-channel 14, within which cables may be passed which allow the electrical signals to be fed and/or transmitted from an external controller to the device 1. Advantageously, once the cables have been positioned and/or passed therein, the channel or hole 14 is filled with silicone, to prevent leakage of the medium present inside the containment element, and to keep the cables in position.

Alternatively, inside the containment element 2 a command and control unit may also be housed comprising wireless connection means, in particular via radio (e.g., via Bluetooth® or internet connection) or even infrared, for transmitting the sounds to be reproduced, and/or a power supply unit, preferably a lithium battery, which allows the electrical power supply of the device 1.

The device 1 further comprises a ring support element 8 positioned in the rear region of the containment element 2. The ring support element 8 has the function of holding the transducer 4 in place in the centre of the containment element suspended inside the medium 10.

Suitably, the transducer 4 may be of different types, in themselves traditional, such as for example:

- dynamic drivers or transducers comprising an extended element, for example a cone vibrated by a magnet,
- balance Armature Driver, in which the membrane is oscillated by a magnetic element inserted in a coil through which alternating current is passed; these transducers are particularly small and have a better response to high frequencies but worse response to low frequencies,
- piezoelectric transducers, in which the membrane is vibrated by the vibration imparted to a piezoelectric actuator; these are particularly suitable for high frequencies, even ultrasonic (greater than 20000 Hertz). However, they are weak on low frequencies.
- acoustic exciters, which comprise coneless speakers attachable to a solid surface that resonates.

Advantageously, the transducer according to the present invention is of a dynamic type.

Suitably, the transducer 4 may comprise a membrane which oscillates/vibrates based on the electrical signals sent in input.

Suitably, the containment element 2 consists of a single housing chamber and the transducer 4 is immersed, at least partially, inside a medium 10 configured to transmit the vibrations generated by the transducer itself. Preferably, the transducer 4 is completely immersed inside the medium 10 so that all the surfaces of the transducer are in contact only with the medium 10. Specifically, the transducer 4 is connected to the containment element 2 only through the rear region. For this purpose, a ring support element 8 is present which guarantees a suspended position of the transducer 4 inside the containment element 2. It should be noted that this configuration determines the presence of a single chamber for the propagation of sound at the different frequencies which comprises both the rear region of the transducer 4 and the lateral regions and possibly also the front region of the transducer.

In the case of a complete immersion of the transducer 4 inside the medium 10, a more efficient response is obtained on the low frequencies thanks to a reflux effect of both parts of the membrane. In particular, the device 1 according to the present invention manages to reach 20 Hz with a flat response (optimal response), the limit of human hearing. The device also has a much better acoustic response on high frequencies, when associated with the correct distance between the transducer and the ear. This can be of considerable help to users with various kinds of hearing impairments.

A fundamental parameter for improving the performance of the device 1 is the ratio between the size of the transducer 4 and the power of the same with respect to the volume of the medium 10 surrounding it. Advantageously, for a transducer 4 having a dimension of about 6 cm in diameter with an impedance of about 8 Ohm, the surrounding medium 10 must have a volume of between 100 and 150 ml of water, i.e., between 100 $cm^3$ and 150 $cm^3$. For example, the ratio of the volume of the transducer 4 to the volume of the medium 10 may range from 1:4 to 1:6, i.e., from 0.25 to 0.167. It has been noted that with such a volumetric ratio, and using for example a dynamic transducer, the performance of the device 1 is considerably better than that of the devices known in the literature, in particular with regard to the reproduction of low and high frequencies.

Advantageously, the transducer 4 is symmetrically positioned inside the medium 10, at least with respect to the lateral surfaces. In particular, to improve the efficiency of the device 1, the distance between the front region 3 of the transducer 4 and the transmission element 12 is between 6 mm and 8 mm. In particular, the device 1 is configured so that the distance between the front region 3 of the transducer 4 and the ear or skull of a user is between 6 mm and 8 mm. Furthermore, advantageously, the distance between the rear region 5 of the transducer 4 and the rear wall 7 of the containment element 2 is between 4 mm and 6 mm. In addition, the distance between the front region 3 and the rear region 5 of the transducer 4 is between 12 and 14 mm.

Suitably, the medium 10 is a liquid or a gel. Preferably, the medium 10 may be oil or water or an ultrasonic gel.

Preferably, said liquid or gel state medium 10 is configured to allow a sound vibration transmission that is at least three times faster than that of air.

It should be noted that even in the case of low viscosity of the medium 10 (when, for example, this is formed by water), its density is at the same time physically perceptible and allows the membrane of the transducer 4 to vibrate more easily.

Advantageously, this allows to obtain a more complete and immersive listening experience for the user.

In addition, the liquid or gel state medium 10 may also allow noise from the outside to be attenuated, thereby acting as a passive noise cancellation system.

Preferably the liquid or gel state medium 10 is hypoallergenic and non-toxic, thus avoiding any risks in case of its dispersal into the environment.

Advantageously, in the case of using a dynamic transducer 4, a chamber, for example cylindrical or conical, may be added to contain the front portion of the transducer 4, or preferably two chambers, one configured to contain the front portion of the transducer 4 and one configured to contain the rear portion of said transducer. Suitably, in such a case the chamber containing the front portion of the transducer 4 may be configured to be in contact, via a second medium which may be, for example, the air, with the outer ear of the user, so as to improve the response to high frequencies; the chamber instead containing the rear portion of the transducer 4 may be completely immersed inside the liquid or gel state medium 10.

Suitably, the liquid or gel state medium 10 may be retained within the containment element 2 by a transmission element 12 which closes the containment element itself. Suitably, the transmission element 12 also acts as a transmitter of the sound waves from the medium 10 to the outside of the device 1.

Preferably, the transmission element 12 has a laminar or membrane configuration but could be defined by a balloon or a cushion.

Suitably, the containment element 2 and the transmission element 12 may be suitably joined, preferably watertight, so as to prevent the leaking of the liquid or gel state medium 10 contained inside the chamber delimited by said containment element 2 and closed by the cover element 12.

Suitably, the transmission element 12 may be inserted inside the containment element 2, and is subsequently sealed by the affixing of a ring, preferably iron, which is constrained with suitable fixing means, for example liquid silicone. Alternatively, the ring may be screwed to, or connected to, the containment element 2 by other suitable fixing means.

Advantageously, the transmission element 12 is made of hypoallergenic, soft, elastic silicone chosen to suitably and comfortably adapt to body parts of various shapes and sizes and, at the same time, to ensure a higher quality sound transmission.

Suitably, the vibrations (sound waves) generated by the transducer 4 are transmitted, via the liquid or gel state medium 10, to the transmission element 12 and the latter is configured to transmit such vibrations (sound waves) directly to the user at body areas of the latter affected by bones and/or body fluids. In particular, this transmission takes place without using additional mediums, except the liquid or gel state medium 10 present in the device 1. Suitably, not only auditory stimulation is obtained, but pallesthesia is also stimulated, i.e., sensitivity to vibrations transmitted between the most rigid tissues of the body, and possibly also "fluid conduction", since the process can allow the transmission of vibrations through body fluids to be stimulated, at least partially. Suitably, this—combined with the higher rate of sound propagation inside the liquid or gel state medium 10 and the bones and/or body fluids—allows to lose the directionality of the sound, thus making the atmosphere more immersive.

Advantageously, the transmission element 12, 12' and/or the containment element 2 may be provided with one or more drainage elements (not shown in the figure), for example one or more holes with one or more caps, which allow the removal of the medium 10 present from the inside of the device, for example to replace it, and also to allow the addition of the medium itself, for example to replenish any loss.

Advantageously, the transmission element 12—thanks to the temperature of the underlying medium 10—keeps the corresponding body contact/application area cool, thus avoiding overheating said body area.

Advantageously, the device 1 may include a temperature control unit, which allows heating and/or cooling the liquid or gel state medium 10, in order to improve the user's comfort and/or the acoustic transmission properties of the medium itself. Suitably, the temperature control unit may be positioned outside the containment element 2 or, preferably, is inserted inside the latter.

Advantageously, the device 1 may include a lighting unit of said medium 10, preferably configured to emit UV light radiation in said medium 10. Suitably, the presence of such a unit allows the medium 10 to be kept sanitized and this is advantageous in particular when using water as the medium 10. Preferably, said lighting unit is located inside the containment element 2 or, alternatively, could be housed outside the containment element 2 in order to lighten the containment element itself. Suitably, in this way, a visible blue/purple light can be generated—resulting from the interaction of the water, defining the medium 10, with the walls of the transmission element 12, 12' and/or the containment element 2—which is particularly relaxing for the user.

Suitably, the device 1 according to the invention may be associated with at least one further device 1 according to the invention, and/or with one or more traditional audio speakers, e.g. headphones, to thereby make an apparatus 20 for sound reproduction. The apparatus 20 is configured to be at least partially in contact with the user's body.

In particular, in this case the use of fluid conduction is particularly advantageous, since the apparatus 20 may advantageously have both a pair of traditional audio speakers, configured to be positioned at the user's auricles, and one or more devices 1 according to the invention, which can be positioned substantially in any body area of the user himself.

An alternative embodiment is shown in FIGS. 6*a*-6*c*. In detail, FIG. 6*a* shows the device 1' viewed from the side, FIG. 6*b* shows a perspective representation of the device 1' and FIG. 6*c* shows the device 1' in an exploded configuration. The device 1' comprises the same elements as the device 1 according to the previous embodiment. Unlike this one, however, the transducer 4 is housed in a doughnut-shaped containment element 2 and the front region of the transducer 4 is in contact with the outside air and faces the user's ear. In addition, a transmission element 12' consisting of three elements, i.e., a fixing ferrule to the containment element 121, a ring surface 122 which is partially in contact with the user's ear, and a spacer member 123 positioned between the ring surface 122 and the transducer 4, specifically the front region of the transducer. The body and the rear region of the transducer 4 are completely immersed inside the medium 10. Advantageously, the containment element 2 is formed by a silicone membrane. By means of this configuration, the airtight chamber of the device 1' is in direct contact with the ear, thereby increasing the performance of the device 1' at high frequencies. Low-frequency performance is ensured by the presence of the medium 10 in the rear area of the transducer 10. It should be noted that the medium 10 also ensures better sound insulation with respect to the surrounding environment.

From the above, it is clear that the device according to the invention is advantageous in that it:

- allows optimal reproduction at both low and high frequencies and at low costs;
- is a valuable aid for people with various kinds of hearing problems, as it improves the sound performance of the user by making use of the vibratory sensitivity (pallesthesia) of the same;
- allows the feeling of a reproduction from all directions, thus giving the user an immersive feeling;
- allows for high comfort;

is particularly ergonomic and, in more detail, is suitable for application to various body areas, including those of different users; and allows external noise to be removed.

It should be noted that all of these and other possible advantages are achievable for the particular configuration of the device as described above.

Specifically, the most advantages are obtained by combining the following aspects:

the possibility of completely immersing the transducer inside the medium, thus determining a single chamber surrounding the transducer itself;

the ratio of the medium and transducer volume as well as the values of the transducer distances from the walls of the containment element, or the distance of the transducer from the user's ear, as defined above; and the use of a dynamic transducer.

The effectiveness of the device 1, 1' according to the present invention has been demonstrated by a series of quantitative tests, performing an acoustic response analysis, as well as qualitative tests, verifying the effects of the device 1, 1' on a sample of over one hundred different users.

The present invention has been illustrated and described in a preferred embodiment thereof, but it is intended that embodiment variants can in practice be made to it, without departing from the scope of protection of the present industrial invention patent.

The invention claimed is:

1. A device for reproducing sounds, in particular sounds intended to be perceived by a user of said device, comprising:

a containment element in which a transducer is housed, which is configured to emit vibrations substantially corresponding to the sound to be reproduced, a liquid or gel state medium which is contained inside said containment element, said medium being configured to transmit the sound vibrations generated by said transducer to a transmission element intended to be applied in direct contact with a body area of said user, thereby transmitting said sound vibrations to said body area, wherein the containment element consists of a single housing chamber and the transducer is immersed completely in the medium inside said chamber, and a ring support element is present to guarantee a suspended position of the transducer inside the containment element.

2. The device according to claim 1, wherein the transmission element closes said containment element to thus define the housing chamber inside which said medium is contained in the liquid or gel state, said transducer being completely immersed in said liquid or gel state medium.

3. The device according to claim 1, wherein the containment element has a doughnut shape and a front region of the transducer is in contact with external air and faces the user's ear.

4. The device according to claim 1, further comprising a temperature control unit configured to heat and/or cool said liquid or gel state medium.

5. The device according to claim 1, wherein said liquid or gel state medium is adapted to allow a transmission of the sound vibrations which is at least three times faster than that of air.

6. The device according to claim 1, further comprising a lighting unit of said medium.

7. The device according to claim 1, wherein said transducer is of a dynamic type and that said medium is water or an ultrasonic gel.

8. The device according to claim 1, wherein the ratio of the volume of the transducer to the volume of the medium contained in the containment element is between 1:4 and 1:6.

9. The device according to claim 3, wherein the distance between the front region of the transducer and the transmission element is between 6 mm and 8 mm.

10. The device according to claim 2, wherein the distance between the rear region of the transducer and a rear wall of the containment element is between 4 mm and 6 mm.

11. The device according to claim 1, wherein the transducer is connected to the containment element only through the rear region.

12. The device according to claim 1 wherein the transducer is an electro-acoustic transducer.

13. The device according to claim 6 wherein the lighting unit of said medium is configured to emit UV light radiation in said medium.

14. An apparatus for reproducing sounds comprising one or more devices according to claim 1, said one or more devices being configured to be applied in contact with the body of the user.

15. The apparatus according to claim 14, further comprising at least one audio speaker.

16. A method of using a device according to claim 1, wherein the transmission element is applied entirely in direct contact with an area of the user's body, said area being outside with respect to the auricle and being defined at least at one body bone and/or body fluid.

* * * * *